United States Patent Office 3,558,414
Patented Jan. 26, 1971

3,558,414
VIBRATION DAMPING METAL LAMINATES
Armand Francis Lewis, Fairfield, Conn., assignor to American Cyanamid Company, Stamford, Conn., a corporation of Maine
No Drawing. Continuation-in-part of application Ser. No. 462,942, June 10, 1965. This application Sept. 3, 1968, Ser. No. 757,130
Int. Cl. B32b *3/30;* G10k *11/00*
U.S. Cl. 161—117
10 Claims

ABSTRACT OF THE DISCLOSURE

Vibration damping metal laminates comprising at least two metal layers bonded together with a rubbery adhesive, wherein at least one of said layers is striated, are disclosed.

CROSS-REFERENCES TO RELATED APPLICATIONS

This application is a continuation-in-part of my co-pending application, Ser. No. 462,942, filed June 10, 1965 now abandoned.

BACKGROUND OF THE INVENTION

Metal laminates are known in the art and have been the subject of numerous patents. Most laminates are satisfactory for many commercial uses but fail in various properties which are essential for commercial use, the most important of which is vibration or sound dampening. That is to say, most commercial metal laminates do not sufficiently dampen mechanical vibration as to allow their usage in, for example, kitchen cabinets, electronic relay chassis, instrument cabinets, base plates for motors, and the like.

For example, British Pat. No. 951,266 teaches a typical commercially available metal laminate over which my laminates are an improvement. The laminates of said patent are composed of two or more metal layers bonded with an adhesive. There is present therein, however, a sheet of flexible polymeric resin which is adhered to each sheet of metal. It is this polymeric sheet which provides the patented laminate with its structural properties. While useful for many purposes, such a system does not sufficiently dampen sound or vibrations to such an extent so as to make them useful in household or industrial applications.

SUMMARY

I have now found that metal to metal laminates can be prepared without the accompanying undesirable features mentioned above. My novel laminates have unique mechanical vibration damping properties and may possess unusual decorative patterns without extra treatment as compared to readily available commercial laminates. Furthermore, they have greater strength than those laminates known in the art and may be utilized for all the applications mentioned above, including architectural devices such as mullions, window tracks, window frames, elevator doors and panels, etc. automotive parts such as trim, dash panels, splash guards, tractor and truck bodies, hub caps, household structures such as kitchen panels, sinks, trim, closet doors, door frames and panels, bathroom panels, shower stalls and cabinets, mail boxes, furnace housings, garage doors, industrial articles such as ducts and exhaust hoods, corrosion resistant chambers, building panels, trim, electronic equipment panels and chassis, instrument cabinets, wall plates, vending machines and the like. Military space applications are also within the realm of applications for my laminates.

By the terms "striation," "striations," "striated" etc. as used herein is meant any distortion of the planar surface of the metal layer, whether the particular distortion is cut, gorged, impressed, etc. in the surface thereof or indented therein so that one surface has a mirror image of the distortion on the other (opposite) surface, no particular design or configuration of the depression or distortion being critical.

As mentioned above, one of the unique features of my metal laminates, is the unusual mechanical virbation damping characteristics thereof. Their ability to dampen out acoustical and mechanical vibrations is even more astounding when it is realized that my laminates vibrate at lower resonance frequency and acoustically there is a sudden drop-off of the noise spectrum at higher frequencies.

My laminates also possess the ability to be stored at 100° C. for over 6 months without delaminating, a factor which thus increases their commercial attractiveness, in that retail and wholesale outlets may maintain a suffiicient supply of the laminates on hand. My products may also be used under cryogenic conditions because no delamination of fabricated structures of the laminate occurs at temperatures as low as −196° C.

DESCRIPTION OF THE INVENTION INCLUDING PREFERRED EMBODIMENTS

Many types of metals may be utilized to produce my laminates with stainless steel as one of the metals and carbon steel or aluminum as the other metal being preferred. Other metals such as zinc, gold, galvanized carbon steel, aluminum coated carbon steel, magnesium, copper, brass, titanium, lead, nickel, silver, nickel alloys and the like may also be utilized in the production of my novel laminates without departing from the scope of the present invention. Double layers of each metal may also be used, i.e. aluminum on aluminum. I may also form a laminate of more than two metal layers, e.g. three layered laminates wherein metal layers are adhered to both planar surfaces of another metal layer and remain within the scope of the instant invention.

The laminates of the instant invention are prepared by coating one or all sides of the metal layers to be bonded together with the adhesive, curing the adhesive if necessary, and placing the metal layers together under pressure to form the laminate. If a curing step is needed, the solvent in the adhesive is evaporated off and the adhesive is then cured at elevated temperatures. The layers may then be pressed together under pressure and post-cured. The adhesives may also be utilized as solvent-free systems whereby no evaporation step is necessary before curing.

My laminates can be produced both by a continuous method whereby rolls of metal are continually coated with adhesive and feed to evaporation (optional), curing and nipping zones or in a bulk method whereby the layers are individually coated with adhesive, such as by spraying, and subjected to heat and pressure consolidation.

At least one of the metal layers of my novel laminates, as mentioned above, must be striated in order to obtain the advantageous properties already set forth hereinabove. The striations may be of any design or configuration with such designs as grooves, squares, diamonds, lines, pits and the like, being exemplary.

The size of the striations used generally depend upon the intended application. It is acceptable, however, to utilize embossed, indented, grooved, quilted, etc. depressions or channels having depths up to 75% of the thickness of the metal, preferably 10% to 50%. The total striated area may range from about 5% to about 80%, preferably 15%–75% of the total surface area of the striated metal. As mentioned above, the striations may merely be carved into one surface of the metal or may also be impressed into the metal, such as by pressure rolling, whereby one side of the metal bears a mirror image of the design impressed on the other side.

The width of the striations may vary from about 0.005 inch to about 1 inch, preferably 0.01 inch to about ¼ inch, and may be equal or random in configuration.

In a preferred embodiment, I have now found that if the general direction of the striations, i.e. grooves, lines, diamonds etc., are perpendicular to the plane of motion or vibration, a more effective damping of the vibration or motion is achieved than if the direction of the striations are parallel thereto.

Additionally, I have found that the damping ability of the laminates is even more effective if the depressions or channels in the striation pattern are in contact with the adhesive rather than if a non-striated surface is in contact therewith. That is to say, if the striation is merely indented into one side of the metal surface, that surface should contact the adhesive. In the mirror image type of striation, if the design of the striation is such that one surface of the metal layer has a raised surface area greater than the depressed or channeled surface area of the other side, the side having the depressed, grooved or channeled surface area should be in the glue line i.e. in contact with the adhesive layer. If the mirror image pattern has equal raised and depressed areas, either side may be in contact with the adhesive layer.

The metal layers of my novel laminates may vary in thickness over a relatively large span. It is generally considered practical, however, to utilize metals having a thickness ranging from about 3 to 1000 mils, the total thickness of the metal layers being at least about 15 mils. Metal layers of the same thickness may be used and conversely, the layers may be of different thickness.

The average thickness of the adhesive layer should be approximately at least 1.0% of the total thickness of the metal layers. Thicker layers are unnecessary and sometimes disadvantageous because of the difficulty in fabricating thicker layer laminates without marring or indenting the surface but are not, however, to be excluded if necessary for some particular service application, especially wherein a thermally and electrically insulating laminate is desired.

As mentioned above, generally any adhesive material may be utilized as the bonding material in forming my novel laminates so long as the material is rubbery. Examples of suitable adhesives include the polyurethane resin based adhesives, silicone rubbers, polysulfides, epory resin-polysulfide mixtures, hydrocarbon rubbers such as butyl rubber-based systems, acrylic rubbers such as nitrile rubbers e.g. those produced from acrylonitrile, polyethylene or polypropylene (rubber modified) systems and the like. Especially useful adhesives are those which possess a dynamic glass transition temperature substantially at or below that temperature at which the laminate is ultimately to be used. Furthermore, the dynamic glass transition frequency of the adhesive at the application temperature of the laminate should be substantially at or above the frequency level to which the laminate will environmentally be subjected. This phenomenon is more fully described in an article by A. F. Lewis et al., Proc. Fourth Int. Congress on Rheol. Part 2, page 505, 1965, which article is hereby incorporated herein by reference. Further examples of useful adhesives include those disclosed and claimed in one or more of the following U.S. patents: 2,610,910; 2,400,612; 2,514,427; 2,581,920; 2,673,845; 2,684,351; 2,879,252; 2,918,442; 2,920,990; 2,977,273, which patents are also hereby incorporated herein by reference.

Among the polyurethane resin-based adhesives which may be used to form my novel laminates are those specifically set forth and claimed in at least one of the following pending U.S. patents: 3,290,208; 3,309,261; 3,391,054, which patents are hereby incorporated herein by reference.

Briefly, these adhesives are composed of the following ingredients:

(A) a polyurethane resin,
(B) a diamine curing agent,
(C) a diglycidyl ester, a diglycidyl ether, a monoethylenically unsaturated monoglycidyl ether, or a monoethylenically unsaturated monoglycidyl ester,
(D) as a substitute for, or in addition to (C), an aminosilane,
(E) as a substitute for (D) and in addition to (C), an epoxy silane, and
(F) in addition to components (A), (B), (C) and (E), a polyethylenically unsaturated compound.

Among the polyurethane resins which may be utilized to prepare these adhesives are the polyester or polyether based resins, although, generally, any known polyurethane resin may be used. One class of polyurethane resins useful in preparing the adhesives used herein are the polyalkylene ether, thioether and ether-thioether glycols known in the art which have been reacted with a suitable isocyanate compound. These alkylene compounds may also be replaced by alkylene-arylene compounds also well known in the art.

A second class of polyurethane resins useful herein are those prepared from linear polyesters containing a plurality of isocyanate-reactive hydroxyl groups, such as those produced by condensing a polyhydric alcohol with a polycarboxylic acid or anhydride. U.S. Pats. Nos. 2,729,618 and 3,016,346 teach examples of various polyurethanes which may be used as components in the resins used herein and also procedures for the production thereof, said patents being incorporated herein by reference.

A polyurethane resin system which has been found to be exceptionally useful comprises a polyester of adipic acid and ethylene glycol which has been reacted with methylene diphenyl isocyanate. The resultant product is then further reacted with 1,4-butanediol. When polyurethane resins of this type are utilized, no curing agent need be employed.

The polyurethane may need to be cured, however, in order to give the optimum results. If such curing is necessary, curing agents such as 4,4'-diamino-diphenylmethane, 4,4'-methylene-bis-2-orthochloroaniline and the like may be used. Ranges of from 0%–200% preferably 40–160%, of the stoichiometric equivalent of the polyurethane resin should be used.

The diglycidyl ethers or esters and the monoethylenically unsaturated monoglycidyl ethers or esters useful as components of the adhesives used herein include glycidyl methacrylate, glycidyl acrylate, allyl glycidyl ether, diglycidyl phthalate, glycidyl benzyl acrylamide, the diglycidyl ether of 2,2-bis(p-hydroxyphenyl)propane and the like, in amounts ranging from 1:2 parts to about 1:16 parts of the esters or ethers to the polyurethane resin, respectively.

In place of the glycidyl esters and ethers, I may use an aminosilane such as gamma-aminopropyl-triethoxysilane, delta-aminobutyldiethoxy silane and the like in concentrations ranging from about 0.1% to about 4.0%, by weight, based on the weight of the polyurethane resin.

Furthermore, if the glycidyl ester or ether is utilized, I may use, in addition thereto, an epoxy silane, such as gamma-glycidoxypropyltrimethoxysilane, in amounts ranging from 0.1% to 10.0%, by weight, based on the total weight of the adhesive per se.

An additional component which may be used in combination with the polyurethane resin, the amine curing agent, the glycidyl ester or ether and the epoxy silane, comprises a polyethylenically unsaturated compound such as tetrallyl melamine, trimethylolpropanitrimethacrylate, divinyl benzene, triallylphosphate, triallylamine, ethylene glycol dimethacrylate, diallylphthalate, 1,4-di(vinyloxy) butane and the like in concentrations of up to about 20%, by weight, based on the total weight of the composition per se.

Before applying the adhesive to the metal, the metal should preferably be chemically clean. This may be achieved by working the metal with hot aqueous alkali or acid solution. The adhesive is preferably used as a 40–50% solution in a solvent and may be applied to the metal by brushing, roller coating, curtain coating or spraying techniques and the like.

The following examples are set forth for purposes of illustration only and are not to be construed as limitations on the present invention. All parts and percentages are by weight unless otherwise indicated.

EXAMPLE 1

To three parts of glycidyl methacrylate are added one part of finely pulverized 3,3-methylenebis-ortho-chloroaniline and 0.35 part of gamma-glycidoxypropyl-trimethoxysilane in a suitable vessel. The vessel is warmed to 70° C. to dissolve the ingredients and then cooled to room temperature. To the resultant mixture are then added 12 parts of a polyurethane polyester based (90/60 ethyleneglycol/propyleneglycol adipate) commercially available polyurethane resin and 0.01 part of 2,5-dimethyl-2,5-di-(t-butylperoxy)n-hexane as a catalyst with stirring. The resultant composition is blended into a smooth paste with the addition of 200 parts of methyl ethyl ketone and is applied to a .020″ thick sheet, 4 inches in width and 10 inches long, of aluminum striated with a diamond pattern. The striations cover 50% of the area of the sheet and are 0.01″ deep and 0.031″ wide. The same composition is then applied to two similarly dimensioned sheets of stainless steel, 12 mil in thickness. The three sheets are heated to 95° C. to evaporate off the methyl ethyl ketone and 145° C. to precure the adhesive. The sheets are then nipped together, the adhesive sides in contact with each other, to produce a three-layer laminated structure having a total thickness of 0.046″.

The resultant metal laminate is then subjected to tests in order to obtain the mechanical vibration dampening properties thereof. Various other metal laminates are also prepared according to Example 1, except that different metals are used and these properties and comparisons to those of the prior art laminates are shown in Table I, below.

The equipment used in this test is known in the art as a freely vibrating torsional and flexural pendulum and the term "Logarithmic Decrements" is a term which indicates the efficiency of the material with respect to damping out mechanical vibrations. The higher the logarithmic decrement, the more efficient is the structure in damping out mechanical vibrations.

Examples 1–4 represent different laminate configurations within the scope of the instant invention while Examples 5–8 represent prior art systems. It can be seen that by the striation of at least one of the metal layers, a material and unexpected increase in the damping properties as represented by the Flexural and Torsional Logarithmic Decrement Data results.

TABLE I

| | Metals used | Structure type [1] | Logarithmic decrement data | |
|---|---|---|---|---|
| | | | Flexural | Torsiona |
| Example: | | | | |
| 1 | Diamond [2] channeled, .020″ aluminum between two sheets of 12 mil stainless steel. | Double laminate | .034 | 0.20 |
| 2 | Diamond [2] patterned, .032″ aluminum between two sheets of 12 mil stainless steel. | do | .087 | 0.47 |
| 3 | Square [3] patterned, .032″ aluminum between two sheets of .012″ stainless steel. | do | .100 | 0.36 |
| 4 | Random pitted [4], 0.040″ aluminum between two sheets of 12 mil stainless steel. | do | .089 | 0.40 |
| 5 [5] | Two sheets of .012″ stainless steel on both sides of .0507″ aluminum solid core. | do | .018 | .096 |
| 6 [5] | Two sheets of .008″ stainless steel on sides of .032″ aluminum coated carbon steel solid base. | do | .016 | .086 |
| 7 [5] | .012″ stainless steel on .025″ carbon steel | Laminate | .013 | .036 |

[1] Substantially same amount of adhesive in each sample.
[2] Dimensions; angular, 0.031″ wide, 0.01″ deep.
[3] Dimensions; 0.625″ long, 0.15″ deep.
[4] Pits are 0.062″–0.031″ in dia. and 0.010″–0.020″ deep.
[5] Comparative.

Again following the procedure of Example 1, various laminates are produced wherein prior art laminates are prepared and then properties are compared to laminates falling within the scope of the present invention. These results are set forth in Table II, below.

TABLE II

| Laminate[1] | Logarithmic decrement data | |
|---|---|---|
| | Flexural | Torsional |
| Example: | | |
| 8 (comp.) 0.001″ aluminum foil/.025″ aluminum | .005 | .107 |
| 9 (comp.) 0.001″ aluminum foil/.025″ aluminum with grooves embossed widthwise, 1/32″ apart | .003 | .103 |
| 10 (comp.) Same as Ex. 9 with 1/8″ slits on 1/16″ centers | .008 | .103 |
| 11 (comp.) Same as Ex. 9 with 1/8″ slits of 1/16″ centers across the strip through foil | .005 | .121 |
| 12 (comp.) 0.001″ aluminum foil (diamond embossed)/.025″ aluminum | .003 | .110 |
| 13 (comp.) Same as Ex. 12 with slits 1/8″ long along length of specimen through foil | .005 | .089 |
| 14 (comp.) 0.003″ aluminum sheet/0.025″ aluminum | .008 | .153 |
| 15 Same as Ex. 14 with grooves embossed across sheet | .005 | .20 |
| 16 .005″ aluminum sheet with corrugation lines across 1/2″ width of specimen 1/16″ apart/ 0.025″ aluminum. | .004 | .18 |
| 17 0.005″ channel embossed aluminum (widthwise channels)/0.010″ aluminum | 0.004 | 0.491 |
| 18 (comp.) 0.005″ channel (widthwise) aluminum 0.005″ aluminum | 0.003 | 0.426 |
| 19 0.040″ channel embossed aluminum (channels in glue line)/0.040″ aluminum sheet (channels going across 1/2″ width). | 0.202 | 0.878 |
| 20 Same as Ex. 19 except channels on exterior of top sheet | 0.146 | 0.485 |
| 21 0.040″ channel embossed aluminum (channels going lengthwise)/0.040″ aluminum sheet (channels in glue line). | 0.123 | 0.415 |
| 22 Same as Ex. 21 except channels on exterior of top sheet | 0.086 | 0.276 |
| 23 0.040″ channeled aluminum/0.040″ channeled aluminum channels in glue line; both metal plies, channels going in same direction lengthwise to the 1/2″ x 10 specimen. | 0.095 | 0.784 |
| 24 Same as Ex. 23 except channels going widthwise across the 1/2″ wide specimen | 0.080 | 0.570 |
| 25 0.040″ channeled aluminum/0.040″ channeled aluminum channels in glue line; channels of metal plies going in opposite direction (mismatched). | 0.100 | 0.542 |
| 26 0.025″ diamond embossed aluminum/0.010″ aluminum | 0.036 | 0.210 |
| 27 0.025″ diamond embossed aluminum/0.040″ aluminum | 0.067 | 0.558 |
| 28 0.025″ aluminum, embosses square patterns commercially available silicone rubber adhesive/0.025″ aluminum. | 0.043 | 0.098 |
| 29 0.025″ aluminum, embossed diamond pattern butyl rubber (commercially available hydrocarbon rubber adhesive)/0.025″ aluminum. | 0.100 | 0.099 |
| 30 Same as Ex. 29 except commercially available acrylic rubber adhesive used | 0.110 | 0.100 |
| 31 Same as Ex. 29 except commercially available polysulfide rubber adhesive used | .056 | 0.091 |
| 32 0.025″ diamond embossed (channel in)/0.010″ aluminum (planar)/0.025″ diamond embossed (channel in). | 0.040 | 2.08 |
| 33 0.025″ diamond embossed (channel in) aluminum/0.025″ diamond embossed (channel in) aluminum. | 0.042 | 0.344 |
| 34 0.025″ diamond embossed (channel out) aluminum/0.025″ diamond embossed (channel out) aluminum. | 0.038 | 0.274 |

[1] All metals indicated as embossed represent mirror image striations. Otherwise, striation cut into surface of metal. Substantially equal amounts of adhesive in each glue line.

NOTE.—Comp.=Comparative.

As can be seen from Table II, the use of a thin metal layer, its thickness falling outside the range disclosed herein as critical, according to U.S. Pat. No. 2,653,889 results in laminates which are relatively poor in torsional vibration damping, see Examples 8–18.

Examples 19–25 teach the unique unexpected results achieved by the instant invention wherein the striations in the striated metal layer are placed in contact with the adhesive layer and the directions of the striations are varied. Such features result in greater vibration damping of the resultant laminates.

Examples 28–31 show that regardless of the particular rubbery adhesive employed, the vibration damping results of the resultant laminates are still far superior to those of the prior art, different adhesives, of course, giving different numerical results.

As is apparent from Examples 26, 27 and 32–34, other configurations of laminates within the scope of the present invention also possess excellent vibration damping properties.

Again following Example 1, three laminates are produced in order to show the effect of the amount of adhesive utilized. The results are shown in Table III wherein it can be seen that increased vibration damping is not a direct function of greater thickness of the adhesive layer, i.e. thick adhesive layers appear to give poorer results than thin layers.

TABLE III

| Laminate[1] | Total thickness | Areal density | Percent adhesive in laminate | Logarithmic decrement data | |
|---|---|---|---|---|---|
| | | | | Flexural | Torsional |
| Example: | | | | | |
| 35 0.040″ (channel) aluminum/0.040″ (channel) | 0.081″ | 1.13 | 3.6 | 0.10 | 0.54 |
| 36 (comp.) 0.040″ (planar) aluminum/0.040″ (planar) aluminum. | 0.083″ | 1.13 | 3.6 | 0.05 | 0.16 |

[1] Same conditions and specifications as in Table II unless otherwise specified.

NOTE.—Comp.=Comparative.

I claim:

1. A vibration damping metal laminate comprising at least one outer metal layer and a metal base layer, the metal layers being bonded together with an elastomeric adhesive layer, at least one of said metal layers having striations, said striations having depths of from about 10% to about 75% of the thickness of the metal and covering from about 5% to about 80% of the total surface area of the striated metal, each of said metal layers being from about 3 to about 1000 mils in thickness, the total thickness of the metal layers in the laminate being at least 15 mils.

2. A metal laminate according to claim 1 wherein the striated side of the striated metal layer is in contact with the adhesive.

3. A metal laminate according to claim 1 wherein the base layer has a striated outer metal layer bonded to each planar side thereof.

4. A metal laminate according to claim 3 wherein the striations of the outer metal layers are in contact with the adhesive.

5. A metal laminate according to claim 1 wherein the adhesive is a polyurethane resin-based adhesive.

6. A metal laminate according to claim 1 wherein the striations in said striated metal layer are impressed in the surface thereof.

7. A metal laminate according to claim 1 wherein the striations in said striated metal layer are such that one surface of said layer possesses a mirror image of the striations on its opposite surface.

8. A vibration damping laminate comprising at least one outer metal layer and a metal base layer, the metal layers being bonded together with an elastomeric adhesive layer, at least one of said metal layers having striations, said striations being either depressions in the metal surface to depths of from about 10% to about 75% of the thickness, the total thickness of the metal layers in the a mirror image thereof on the reverse side of the metal, said striations covering from about 5% to about 80% of the total surface area of the striated metal, each of said metal layers being from about 3 to about 1000 mils in thickness, the total thickness of the metal layers in the laminate being at least 15 mils.

9. A metal laminate according to claim 8 wherein the striated side of the striated metal layer is in contact with the adhesive.

10. A metal laminate according to claim 8 wherein the base layer has a striated outer metal layer bonded to each planar side thereof.

References Cited

UNITED STATES PATENTS

| | | | |
|---|---|---|---|
| 2,237,623 | 4/1941 | Ledwinka | 161—113 |
| 2,830,001 | 4/1958 | Barnes et al. | 161—119X |
| 3,110,369 | 11/1963 | Ruzicka | 181—33.1 |
| 3,309,261 | 3/1967 | Schiller | 161—190 |

OTHER REFERENCES

Epstein, George: Adhesive Bonding of Metals, Reinhold Publishing Corp., New York (1954), page 170, relied on.

ROBERT F. BURNETT, Primary Examiner

R. O. LINKER, Jr., Assistant Examiner

U.S. Cl. X.R.

161—121, 190, 213; 181—33

UNITED STATES PATENT OFFICE
CERTIFICATE OF CORRECTION

Patent No. 3,558,414  Dated January 26, 1971

Inventor(s) Armand Francis Lewis

It is certified that error appears in the above-identified patent and that said Letters Patent are hereby corrected as shown below:

Column 4, line 3 "epory" should be -- epoxy -- .

Column 9, line 14, ", the total thickness of the metal layers in the" should read -- of the metal or embossments the metal having -- .

Signed and sealed this 28th day of September 1971.

(SEAL)
Attest:

EDWARD M. FLETCHER, JR.  ROBERT GOTTSCHALK
Attesting Officer  Acting Commissioner of Pa